United States Patent
Park et al.

(10) Patent No.: US 6,529,658 B1
(45) Date of Patent: Mar. 4, 2003

(54) APPARATUS AND METHOD FOR FABRICATING FIBER GRATING

(75) Inventors: Moo-Youn Park, Kwangmyong-shi (KR); Min-Sung Kim, Songnam-shi (KR)

(73) Assignee: Samsung Electronics Co., Ltd., Suwon (KR)

( * ) Notice: Subject to any disclaimer, the term of this patent is extended or adjusted under 35 U.S.C. 154(b) by 169 days.

(21) Appl. No.: 09/608,133

(22) Filed: Jun. 30, 2000

(30) Foreign Application Priority Data

Jul. 7, 1999 (KR) .............................. 99-27277

(51) Int. Cl.⁷ ................................ G02B 6/34
(52) U.S. Cl. ..................... 385/37; 385/14; 385/130; 385/129; 359/558; 359/566
(58) Field of Search ................ 385/37, 12, 14, 385/123, 129, 130; 359/572, 58, 566

(56) References Cited

U.S. PATENT DOCUMENTS

| 5,367,588 A | * 11/1994 | Hill et al. ..................... 385/37 |
| 5,600,665 A | 2/1997 | Minden et al. ................. 372/6 |
| 5,620,495 A | 4/1997 | Aspell et al. |
| 5,745,617 A | 4/1998 | Starodubov et al. .......... 385/37 |
| 5,760,960 A | 6/1998 | Lin et al. |
| 5,818,988 A | 10/1998 | Modavis |
| 5,830,622 A | 11/1998 | Canning et al. |
| 5,859,945 A | 1/1999 | Kato et al. ..................... 385/89 |
| 6,072,926 A | 6/2000 | Willard et al. |
| 6,243,517 B1 | * 6/2001 | Deacon ....................... 385/50 |

FOREIGN PATENT DOCUMENTS

| EP | 0 880 042 A | 11/1998 |
| JP | 10-115701 | 5/1998 |
| JP | 11-326655 | 11/1999 |

* cited by examiner

Primary Examiner—Thong Nguyen
Assistant Examiner—Fayez G Assaf
(74) Attorney, Agent, or Firm—Robert E. Bushnell, Esq.

(57) ABSTRACT

An apparatus and method for fabricating fiber gratings. To fabricate fiber gratings using a mask having gratings written therein, at least two optical fibers are arranged in parallel, in which the fiber gratings will be written by periodic variations in the refractive indexes of the photosensitive cores thereof, the mask is disposed on the optical fibers to cover gratings-forming portions of the optical fibers, and a laser beam is projected on the mask in a focused light size covering the gratings-forming portions of the optical fibers, to change the refractive indexes of the cores.

13 Claims, 4 Drawing Sheets

APPARATUS AND METHOD FOR FABRICATING FIBER GRATING

CLAIM OF PRIORITY

This application makes reference to, incorporates the same herein, and claims all benefits accruing under 35 U.S.C §119 from an application Entitled Apparatus And Method For Fabricating Fiber Grating earlier filed in the Korean Industrial Property Office on Jul. 7, 1999, and there duly assigned Serial No. 99-27277 by that Office.

BACKGROUND OF THE INVENTION

1. Field of the Invention

The present invention relates generally to a fiber gratings (or a fiber Bragg grating) as an optical fiber device, and in particular, to an apparatus and method for fabricating a fiber grating.

2. Description of the Related Art

Fiber gratings are written in an optical fiber by irradiating the core of the optical fiber with laser beams emitted from a UV (UltraViolet) excimer laser (e.g., a KrF or ArF excimer laser) in order to incur periodic variations in the refractive index of the core. The refractive index of the core increases as it is exposed longer to the laser beams and the periodic refractive index variation is effected by projecting the laser beams along the length direction of the core periodically.

The fiber gratings selectively reflect a specific wavelength component of light traveling along the core or leak the wavelength component into a clad according to a refractive index variation period, refractive variation magnitude, and grating length. The reflected or leaked wavelength component is termed a central wavelength.

Research has been actively conducted on development of an optical fiber laser using fiber gratings and application of a fiber grating to an optical fiber sensor and many modifications or improvements have been made to the fiber gratings, such as a chirped fiber grating, a long period grating, and a tilted grating. Recently, fiber gratings have widely been used for dispersion compensation of an optical fiber, pulse compression, sensing, and flattening of EDF (Erbium Doped Fiber) gain spectrum.

Fiber gratings are fabricated by a holographic method, a phase mask method, or a point by point method.

The holographic method is called an interference method, in which periodic patterns are written in the core of an optical fiber according to interference spectrum by splitting a laser beam through a beam splitter and combining the split beams through reflective mirrors. The holographic method has the distinctive shortcomings of difficult system alignment and requirement of an expensive laser with a great coherence distance.

A phase mask is a diffractive optical element (DOE) that serves to branch an incident laser beam in diffraction directions of different orders. To fabricate fiber gratings using such a phase mask, a zero-order diffraction pattern of a laser beam perpendicularly incident on the phase mask is suppressed to several % or below and the other laser beams are diffracted in first-order directions by setting the height of gratings to an appropriate level in the phase mask. Thus, the diffracted light incur interference in the core. As compared to the holographic method, the phase mask using method can be implemented with a cheap industrial laser due to its advantages of system simplicity, stable formation of gratings, and little influence from temporal coherence characteristics of a laser beam.

The formation of fiber gratings is discussed in the following references incorporated by reference herein: U.S. Pat. No. 5,620,495 to Jennifer Aspell et al. entitled Formation Of Gratings In Polymer-Coated Optical Fibers; U.S. Pat. No. 5,818,988 to Robert A Modavis entitled Method Of Forming A Grating In An Optical Waveguide; U.S. Pat. No. 5,830,622 to John Canning et al. entitled Optical Grating; and U.S. Pat. No. 6,072,926 to Martin Cole et al. entitled Optical Waveguide Grating.

A conventional fiber grating fabricating apparatus includes a high power laser source for emitting a UV laser beam, a lens unit for focusing the UV laser beam, a phase mask through which the focused light is projected, and a fixture closely disposed to the phase mask for fixing an optical fiber in which gratings will be written. A reflective mirror may be further included to help the light emitted from the laser source accurately impinge on the lens unit by changing the path of the light. Prior to fixing the optical fiber in the fixture, a coating is peeled off from grating forming portions of the optical fiber. The phase mask is arranged in contact with the coating-removed portions of the optical fiber. A UV laser beam emitted from the laser source is focused on the phase mask through the lens unit. The laser beam incurs interference in the photosensitive core of the optical fiber through the phase mask and then gratings are written in the core in an appropriate period. The gratings are completed by forming a coating on the gratings-formed portions of the optical fiber.

Technology of narrowing channel spacing or widening an available wavelength band is under development in the field of WDM (Wavelength Division Multiplexing) transmission that is a widely employed scheme for an optical transmission system. This situation requires that a fiber grating used for an optical fiber laser or filter should operate more accurately.

With high accuracy, therefore, the laser source, the lens unit, and the phase mask should be positioned and accurately on the fiber to form the grating. Accordingly, only one fiber having a grating formed therein can be made. As a result, it takes a long time to fabricate one fiber grating on a single fiber, thus the product yield is low and cost is high.

SUMMARY OF THE INVENTION

An object of the present invention is, therefore, to provide an apparatus and method for fabricating a fiber grating with a higher product yield.

Another object of the present invention is to provide an apparatus and method for fabricating a fiber grating to be used as a sensor with a higher product yield.

To achieve the above objects, there is provided an apparatus and method for fabricating fiber gratings. To fabricate fiber gratings using a mask having gratings written therein, at least two optical fibers are arranged in parallel, in which the fiber gratings will be written by periodic variations in the refractive indexes of the photosensitive cores thereof, the mask is disposed on the optical fibers to cover gratings-forming portions of the optical fibers, and a laser beam is projected on the mask in a focused light size covering the gratings-forming portions of the optical fibers, to change the refractive indexes of the cores.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

Figure 1:
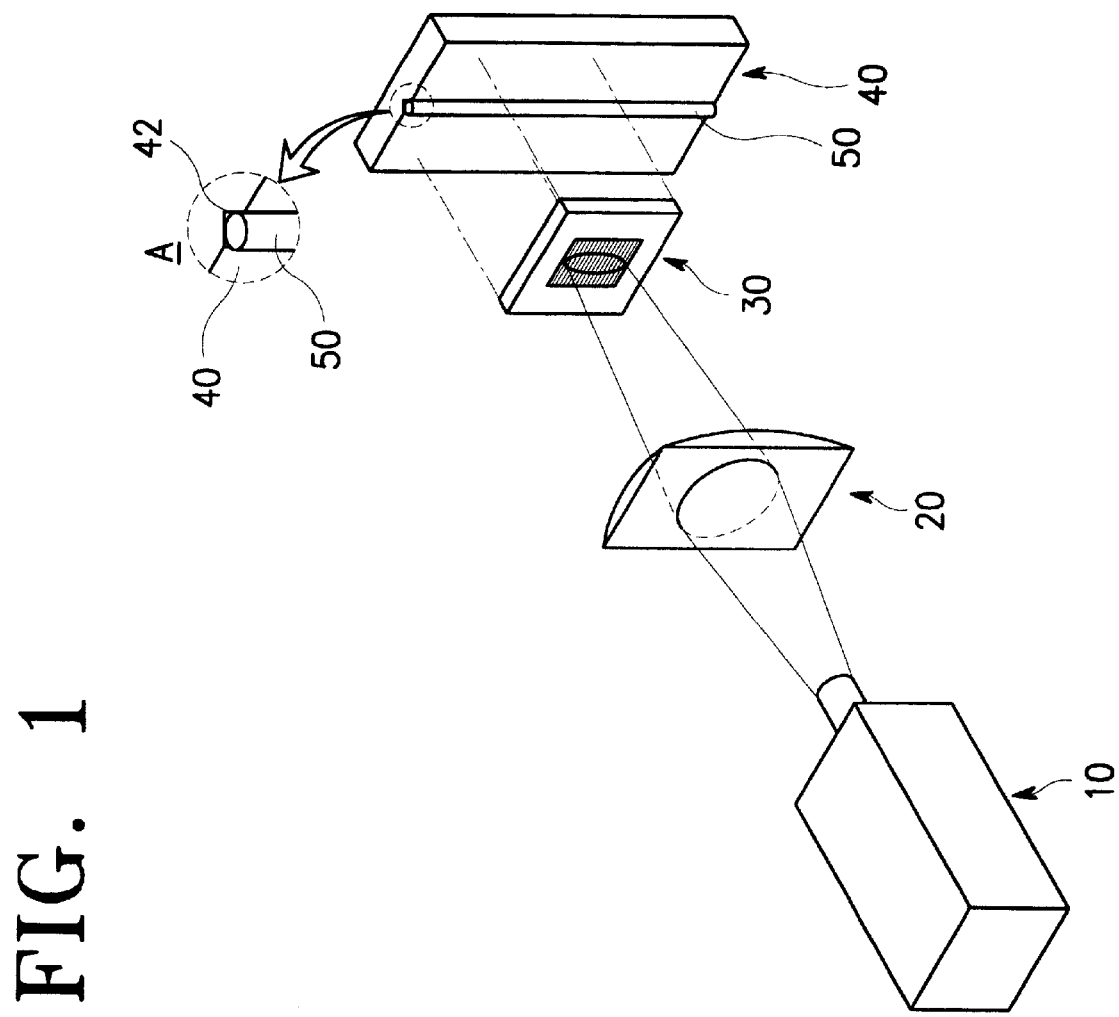
FIG. 1 is a schematic view of a fiber grating fabricating apparatus using a phase mask.

A description is made of a method of fabricating fiber gratings using a phase mask with reference to FIG. 1.

FIG. 1 is a schematic view of a fiber grating fabricating apparatus using a phase mask. It is to be realized that the shape and position of each component are rather artificial in the drawing for clarity of description. Referring to FIG. 1, the fiber grating fabricating apparatus includes a high power laser source 10 for emitting a UV laser beam, a lens unit 20 for focusing the UV laser beam, a phase mask 30 through which the focused light is projected, and a fixture 40 closely disposed to the phase mask 30, for fixing an optical fiber 50 in which gratings will be written. Though not shown, a reflective mirror may be further included to help the light emitted from the laser source 10 accurately impinge on the lens unit 20 by changing the path of the light.

In FIG. 1, reference character A indicates an enlarged contact portion between the fixture 40 and the optical fiber 50. A V-groove 42 is formed into the fixture 40 to fixedly secure the optical fiber 50. Prior to fixing the optical fiber 50 in the fixture 40, a coating is peeled off from grating forming portions of the optical fiber 50. The phase mask 30 is arranged in contact with the coating-removed portions of the optical fiber. A UV laser beam emitted from the laser source 10 is focused on the phase mask 30 through the lens unit 20 with a spot size ranging from a few micrometers to tens of micrometers. The laser beam incurs interference in the photosensitive core of the optical fiber 50 through the phase mask 30 and then gratings are written in the core in an appropriate period. The gratings are completed by forming a coating on the gratings-formed portions of the optical fiber 50.

With high accuracy, therefore, the laser source 10, the lens unit 20, and the phase mask 30 should be positioned and a spot size should be determined in the fiber grating fabricating apparatus shown in FIG. 1 and in its fabrication process.

In a fiber grating fabricating method using a phase mask according to the present invention, a laser beam is focused across a large area on the phase mask, as compared to known methods. Another feature of the present invention is that a plurality of optical fibers are arranged under the phase mask and gratings are written in the plurality of optical fibers at the same time using the laser beam and the phase mask. A rather large uniformless spot size is and intensity distribution of light are projected onto the core of an optical fiber through the phase mask in the present invention. Consequently, a fiber grating fabricated according to the present invention has a less accurate central frequency than intended in a designing stage. However, the present invention is applicable to fabrication of fiber gratings that do not require a high precision, for example, fiber gratings that allow a process error of about 0.5 nm in central frequency accuracy, although fiber gratings having high-precision operational characteristics have been required recently. Especially, fiber gratings fabricated according to the present invention find their full applications in sensors.

As for a fiber grating of the present invention to be used as a sensor, the central frequency of the fiber grating is determined by the period of variations in the refractive index of a core and the magnitude of a refractive index variation, as stated before. Therefore, the central frequency varies with a change in the period and magnitude of the refractive index variation, that is incurred by external physical factors such as strain or temperature. Since the variation rate of the central frequency with respect to a physical factor is linear, information about the physical factor can be detected by measuring the variation of the central frequency.

A fiber grating reacts to a physical factor in the form of a variation in the central frequency and it is not so significant whether the central frequency of a fiber grating is different from that intended in designing. Therefore, a rather large error is allowed in a fabrication process when a fiber grating is to be used as a sensor.

There will be given a description of the present invention useful to fabricate fiber gratings that do not require a high precision referring to FIG. 2.

Figure 2:
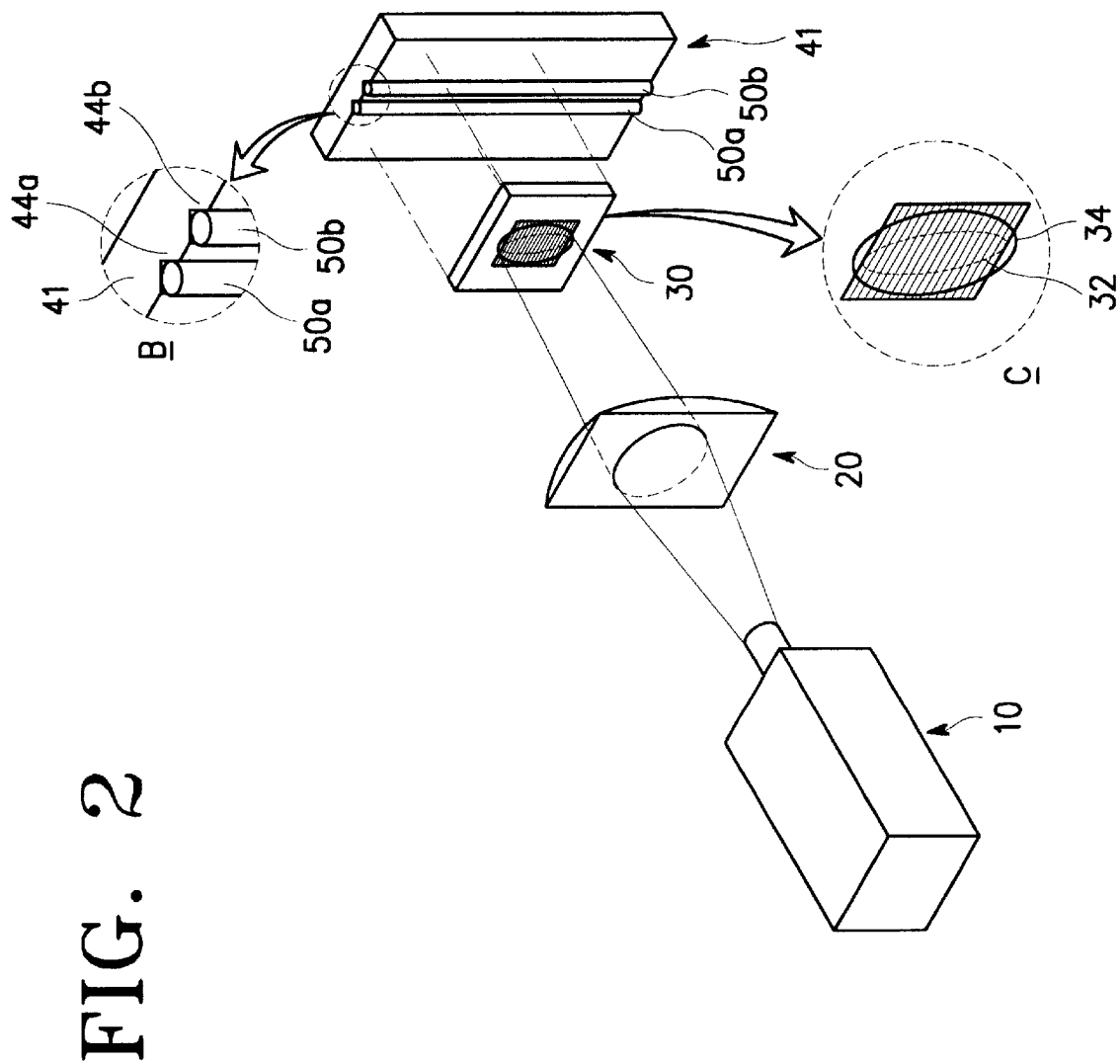
FIG. 2 is a schematic view of a fiber grating fabricating apparatus using a phase mask according to an embodiment of the present invention.

FIG. 2 is a schematic block diagram of a fiber grating fabricating apparatus using a phase mask according to an embodiment of the present invention. For clarity of description, the shape and position of each component is shown artificial. As shown in FIG. 2, the fiber grating fabricating apparatus of the present invention is capable of fabricating two or more fiber gratings at one time (two fiber gratings at one time, herein, by way of example). The fiber grating fabricating apparatus of the present invention is comprised of the high power laser source 10 for emitting a UV laser beam, the lens unit 20 for focusing the laser beam, the phase mask 30 through which the focused beam is projected, and a fixture 41 close to the phase mask, for fixing optical fibers 50a and 50b in which gratings will be written.

The fiber grating fabricating apparatus is different from that of FIG. 1 in that the fixture 41 is so configured as to fix at least two optical fibers adjacent to each other in parallel V-grooves. Reference character B indicates an enlarged contact portion between the fixture 41 and the two optical fibers 50a and 50b. The fixture 41 has two parallel V-grooves 44a and 44b for securing the optical fibers 50a and 50b. Coatings are peeled off from gratings-forming portions of the optical fibers 50a and 50b prior to fixing the optical fibers 50a and 50b in the V-grooves 44a and 44b.

The phase mask 30 is arranged to cover the gratings-forming portions of the optical fibers 50a and 50b in contact with the coating-removed portions thereof.

While FIG. 2 shows the apparatus of fabricating two fiber gratings at the same time by use of the fixture 41 having the two V-grooves 44a and 44b and the phase mask 30 facing the fixture 41, more than two fiber gratings can be formed simultaneously by increasing the number of the V-grooves and forming the phase mask 30 into an appropriate shape. When only two fiber gratings are fabricated at one time as shown in FIG. 2, a phase mask as shown in FIG. 2 can be used as the phase mask 30.

A UV laser beam emitted from the laser source 10 is focused on the phase mask 30 through the lens unit 20 with a spot size of about hundreds of micrometers. Gratings on the phase mask 30 are circled by a dotted line as indicated by reference character C. Two ovals 32 and 34 indicate the shapes of focused light. The smaller dotted oval 32 represents a spot size observed on the phase mask of FIG. 1, by way of example, whereas the larger solid oval 34 represents a spot size observed on the phase mask according to the present invention. A spot is formed in order to simultaneously project light onto the two optical fibers 50a and 50b through the phase mask 30. The size of light focused on the phase mask 30 can be increased by changing a focus distance, preferably increasing the focus distance through appropriate control of the lens unit 20 or appropriately controlling the laser source 10. Preferably, light is focused over a larger area by using the laser source 10 and lens unit 20 and positioning the phase mask 30 before or behind a predetermined focusing location. The problem of decreased light intensity per unit area resulting from an increased spot size can be solved by increasing the output power of the laser source 10. However, when the number of fiber gratings fabricated at one time is just two, like the embodiment of the present invention shown in FIG. 2, fabrication of fiber gratings is effected by setting the output power of the laser source 10 to a conventionally known level.

To complete fiber gratings, coatings are formed on the gratings-formed portions of the optical fibers 50a and 50b. Characteristics of the completed fiber gratings will be described referring to FIGS. 3 and 4.

Figure 3:
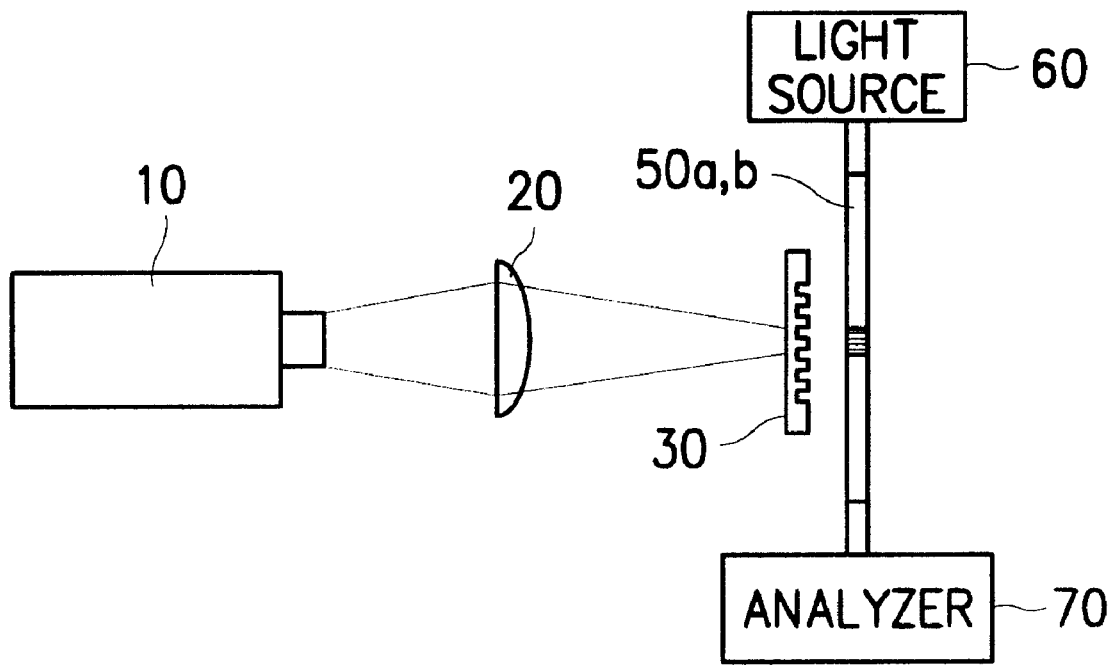
FIG. 3 is a schematic block diagram of a measurer for measuring characteristics of a fiber grating fabricated in the fiber grating fabricating apparatus shown in FIG. 2.
Figure 4:
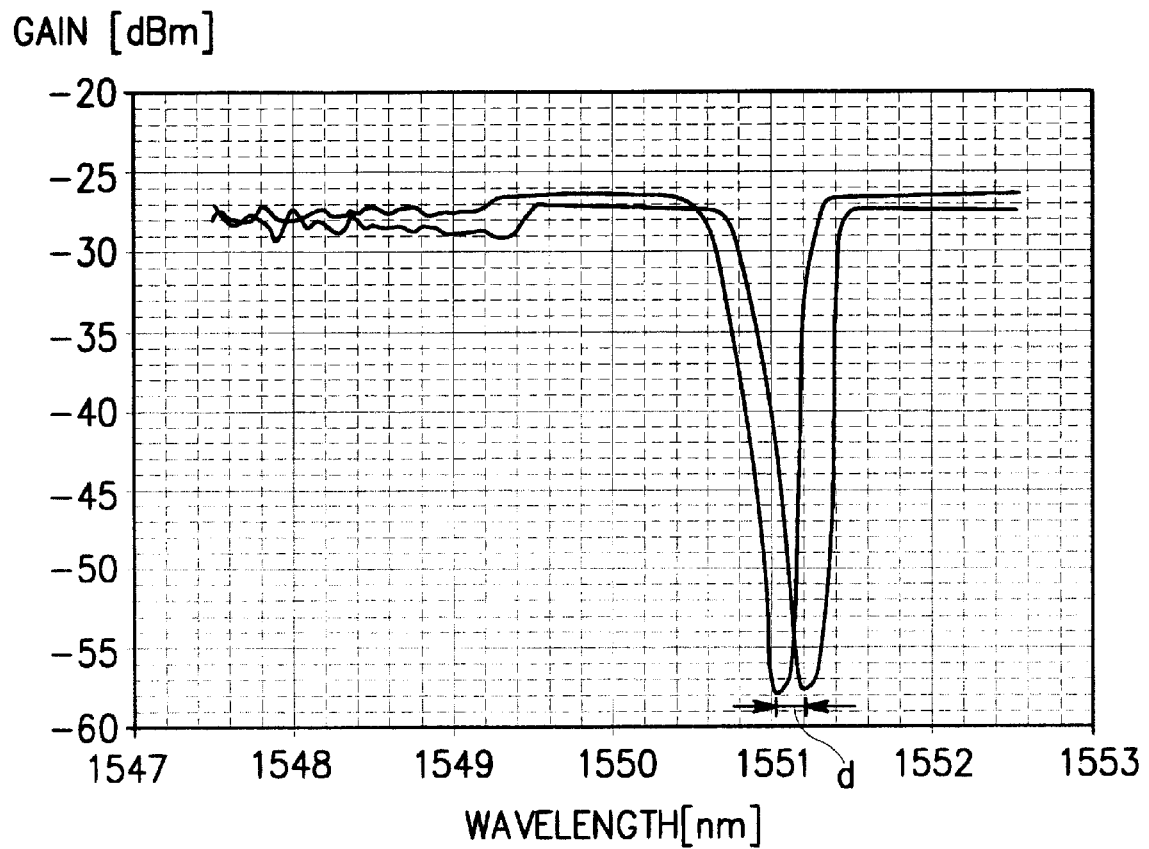
FIG. 4 is a graph showing the optical spectrum of the fiber grating measured by the fiber grating characteristic measurer shown in FIG. 3.

FIG. 3 is a schematic block diagram of a measurer for measuring characteristics of a fiber grating fabricated in the fiber grating fabricating apparatus according to the embodiment of the present invention, and FIG. 4 is an exemplary light spectrum of the fiber grating measured by the fiber grating characteristic measurer shown in FIG. 3.

Referring to FIG. 3, the fiber grating characteristic measurer includes a light source 60 and an analyzer 70 for analyzing light emitted from the light source 60 and passed through one, or both, of the optical fibers (50a and 50b). The analyzer 70 is a spectrum analyzer. Light emitted from the laser source 10 is focused on the phase mask 30 through the lens unit 20 and then gratings are written in the optical fibers 50a and 50b. In this process, a laser beam emitted from the light source 60 is applied to the optical fibers 50a and/or 50b and laser beams output from the optical fibers 50a and/or 50b are analyzed in the analyzer 70.

In the present invention, fiber gratings are fabricated under conditions that the phase mask 30 is installed in such a way that the central frequency of a fiber grating is 1550.8 nm, the output power of the laser source 10 is 140 mj/cm2, and a 5 Hz-laser beam is projected for 3 minutes. The optical fibers 50a and 50b having the fiber gratings written therein exhibit such characteristics as shown in FIG. 4.

Referring to FIG. 4, the central frequencies of the optical fibers 50a and 50b are about 1550.82 nm and 1551.02 nm, respectively, with the central frequency difference d of about 0.2 nm. This implies that since a process error for the case of fabricating gratings in the two optical fibers 50a and 50b at the same time is 0.5 nm or less, the fabricated fiber gratings can be used as sensors.

In accordance with a fiber grating fabricating method of the present invention as described above, a laser beam is focused on the a phase mask over a larger area than in known methods. A plurality of optical fibers are arranged under the phase mask and gratings are formed in the optical fibers at the same time using the laser beam and the phase mask. As a result, fiber gratings suitable for a sensor can be fabricated with a higher product yield and reduced cost.

While the present invention has been shown and described with reference to a certain preferred embodiment thereof, it will be understood by those skilled in the art that various changes in form and details may be made therein without departing from the spirit and scope of the invention as defined by the appended claims. Especially the embodiment of the invention has been described in the context with fabrication of fiber gratings using a phase mask, but the phase mask can be substituted for by an amplitude mask. An amplitude mask is formed of a material such as chrome (Cr) and has periodic light transmission and blocking patterns, unlike the phase mask relying on light interference. Light passes through windows arranged at periodic intervals according to the patterns and gratings are formed by disposing an optical fiber having a photosensitive core at a position corresponding to the windows. The amplitude mask is usually used to fabricate a long period fiber grating.

The present invention is applicable to a chirped fiber grating and a tilted fiber grating as well as the long period fiber grating. Therefore, it is intended that the present invention should not be limited to the particular embodiment disclosed as the best mode contemplated for carrying out the present invention, but the present invention includes all embodiments falling within the scope of the appended claims.

What is claimed is:

1. A method of fabricating fiber gratings using a mask having gratings written therein, comprising the steps of:
    arranging at least two optical fibers in parallel, in which the fiber gratings will be written by periodic variations in the refractive indexes of the photosensitive cores thereof;
    disposing the mask on the optical fibers to cover gratings-forming portions of said at least two optical fibers; and
    projecting a laser beam on the mask in a focused light size through a single lens covering the gratings-forming portions of said at least two optical fibers, to change the refractive indexes of the cores.

2. The method of claim 1, wherein the mask is a phase mask.

3. The method of claim 1, wherein the mask is an amplitude mask.

4. The method of claim 1, wherein the focused light size is hundreds of micrometers.

5. The method of claim 1, wherein the focused light size is made larger than a spot size by positioning the mask before a light focused position.

6. A method of fabricating fiber gratings using a phase mask, comprising the steps of:
    arranging a plurality of optical fibers, in which the gratings will be written simultaneously, under the phase mask; and
    focusing a laser beam emitted from a laser source through a single lens; and
    projecting the focused laser beam on the phase mask in a focused light size larger than a spot size.

7. The method of claim 6, wherein the focused light size is made larger than a spot size by positioning the phase mask before a light focused position.

8. The method of claim 6, wherein the focused light size is hundreds of micrometers.

9. A fiber grating fabricating apparatus comprising:
    a high power laser source for emitting a UV laser beam;
    a fixture for fixedly securing a plurality of optical fibers in which gratings will be simultaneously written by periodic variations in the refractive indexes of the cores thereof;
    a mask for providing incident light with periodic intensity variations on gratings-forming portions of the plurality of optical fibers fixed in the fixture; and a single lens for focusing the UV laser beam emitted from the laser source and projecting the focused light on the mask in a size covering the gratings-forming portions of the plurality of optical fibers.

10. The fiber grating fabricating apparatus of claim 9, wherein the mask is a phase mask.

11. The fiber grating fabricating apparatus of claim 9, wherein the fixture has two V-grooves for fixedly securing two optical fibers.

12. The fiber grating fabricating apparatus of claim 8, wherein the fixture has at least two V-grooves for fixedly securing at least two optical fibers.

13. The fiber grating fabricating apparatus of claim 9, wherein the focused light has a focused light size made larger than a spot size by positioning the mask before a light focused position.

* * * * *